United States Patent
Kim

(10) Patent No.: US 6,871,960 B2
(45) Date of Patent: Mar. 29, 2005

(54) COOLING SYSTEM FOR PROJECTOR

(75) Inventor: Byung Hee Kim, Kumi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/362,416

(22) PCT Filed: Aug. 29, 2001

(86) PCT No.: PCT/KR01/01457

§ 371 (c)(1),
(2), (4) Date: Feb. 25, 2003

(87) PCT Pub. No.: WO02/18857

PCT Pub. Date: Mar. 7, 2002

(65) Prior Publication Data

US 2003/0184717 A1 Oct. 2, 2003

(30) Foreign Application Priority Data

Aug. 30, 2000 (KR) ................ 10-2000-0050749

(51) Int. Cl.$^7$ .......................... G03B 21/16; G03B 21/18
(52) U.S. Cl. .......................... 353/58; 353/60
(58) Field of Search .............................. 353/52, 57, 58, 353/60, 61

(56) References Cited

U.S. PATENT DOCUMENTS

| 6,007,205 A | 12/1999 | Fujimori .................. 353/57 |
| 6,513,936 B1 * | 2/2003 | Ishiwa et al. ............. 353/58 |
| 6,572,231 B1 * | 6/2003 | Watanabe ................. 353/52 |

FOREIGN PATENT DOCUMENTS

| JP | 09-113998 | 2/1997 |
| JP | 10-020400 | 1/1998 |
| JP | 11-295814 | 10/1999 |
| JP | 11-295815 | 10/1999 |

* cited by examiner

Primary Examiner—Christopher E Mahoney
(74) Attorney, Agent, or Firm—Fleshner & Kim, LLP

(57) ABSTRACT

Disclosed is a cooling system for a projector which is capable of more quickly exhaust the hot air generated in the interior of the projector. A cooling system for a projector comprising a suction fan placed at the top of a synthesizing system of the projector, a fan guide fastened at a surface between the top of the synthesizing system and the bottom of the suction fan, the fan guide having a configuration in which one end is shorter the other so that the suction fan is place in a incline position to allow the hot air to be rapidly exhausted.

26 Claims, 5 Drawing Sheets

COOLING SYSTEM FOR PROJECTOR

TECHNICAL FIELD

The present invention relates to a cooling system for cooling heat of a high temperature created by an irradiation of a large amount of light in a projector, and more particularly, a cooling system for a projector having a capability of rapidly and effectively cooling a synthesizing system including an LCD panel or the like and serving to synthesize images in the projector.

BACKGROUND ART

FIG. 1 is a view schematically illustrating a conventional projector.

Referring to FIG. 1, the conventional projector includes an illumination system 10a including a lamp assembly 11 adapted to irradiate light, an optical engine unit 10 including a synthesizing system 10b for forming an image, a projection lens unit 20 for refracting and diffusing light to form an image on a screen, a suction fan 31 installed on the top of the projector and adapted to intake ambient air, an exhaust fan 32 installed at the rear wall of the projector and adapted to exhaust hot air generated in the interior of the projector to outside, a lower case 30 installed in the rear of the exhaust fan 32 to protect the exhaust fan 32, and an upper case (not shown) adapted to cover the top of the projector and separates the interior of the projector from the external in cooperation with the lower case 30.

Hereinafter, the operation of the conventional projector having the above mentioned configuration will be described briefly. The lamp assembly 11 generates and irradiates the light. The light irradiated by the lamp assembly 11 is projected onto an image formed on the LCD panel of the synthesizing system 10b while being subjected to a refracting or synthesizing process. Thus, the light projected onto the synthesizing system 10b contains an image signal. This light finally forms a picture on the screen after being controlled in its projection direction as it passes through the projection lens unit 20.

The synthesizing system 10b, which is a part of the projector for forming an image, will be described in more detail. The synthesizing system 10b includes an LCD panel for forming an image, and a prism for reflecting or synthesizing light.

The LCD panel includes three LCD panels respectively associated with red (R), green (G), and blue (B) colors. Light beams obtain different color signals as they are projected onto the LCD panels. These light beams are synthesized together by the prism, and then finally projected onto the screen, thereby forming a picture. When the light is projected onto the R, G, and B LCD panels to form images, a large amount of heat is generated at those LCD panels due to the projected light.

The structure of the LCD panel will be described again in association with a cooling configuration thereof. The suction fan 31, which discharges heated air having a high temperature, is attached to the top of the synthesizing system 10b. Without the suction fan 31, the heat is then accumulated in the synthesizing system 10b causing the liquid crystal present in the LCD panel to be boiled. This is generally known as an LCD boiling phenomenon. When the LCD boiling phenomenon occurs, a dark image is displayed on the screen. In severe cases, polarizing plates may be burnt.

In this regard, it is important to properly cool the projector, especially in latest projectors in which an irradiation of strong light is required to form a large and distinct image. In particular, the products of a high luminance corresponding to 200 ANSI lumens, a projector cooling means has became an important factor in determining the quality of products.

The construction of the above-mentioned suction fan 31 of the conventional projector cooling systems and an air flow created by the suction fan 31 will be described in detail.

FIG. 2 is a side view illustrating the installed state of the suction fan in the conventional projector. Referring to FIG. 2, the cooling system includes an upper case 40 for covering the top of the projector to protect the internal parts of the projector. The suction fan 31 is also included in the cooling system. The suction fan 31 is placed below the upper case 40 with a fixed spaced apart from the upper case to suck and exhaust the hot air in the synthesizing system 10b.

The operation of the above mentioned cooling system used in the conventional projector will be described hereinafter. In order to cool the synthesizing system 10b heated during the operation of the projector, the suction fan 31 placed above the synthesizing system 10b exhausts air in the inside of the synthesizing system 10b. The hot air exhausted by the suction fan 31 is dispersed in the interior of the projector so that it is naturally cooled. Alternatively, the hot air is externally exhausted by the exhaust fan 32. Thus, the cooling of the projector is achieved.

However, the above mentioned conventional cooling system has a problem in that the synthesizing system 10b is inefficiently cooled because hot air present in the synthesizing system 10b dispersed in the interior of the projector after being discharged by the suction fan 31, and then partially introduced again into the synthesizing system 10b.

DISCLOSURE OF INVENTION

Therefore, an object of the invention is to provide a cooling system for a projector which is capable of quickly exhausting hot air introduced into the synthesizing system by a suction fan without any influence on other parts of the projector.

In accordance with the present invention, this object is accomplished by providing a cooling system for a projector comprising a suction fan placed at the top of a synthesizing system of the projector, an exhaust fan for exhausting the hot air in the projector to outside, and a fan guide fastened at a surface between the top of the synthesizing system and the bottom of the suction fan, the fan guide having a configuration in which one end is shorter the other so that the suction fan is place in a incline position to allow the hot air to be rapidly exhausted.

The projector cooling system of the present invention solves the problems of the conventional cases in association with the cooling of the synthesizing system or other heat sources included in the projector by quickly exhausting the hot air generated in the synthesizing system through the exhaust fan by use of the air flow guide means.

BRIEF DESCRIPTION OF DRAWINGS

The above objects, and other features and advantages of the present invention will become more apparent after a reading of the following detailed description when taken in conjunction with the drawings, in which.

BEST MODE FOR CARRYING OUT THE INVENTION

Now, preferred embodiments of the present invention will be described in conjunction with the annexed drawings.

Figure 1:
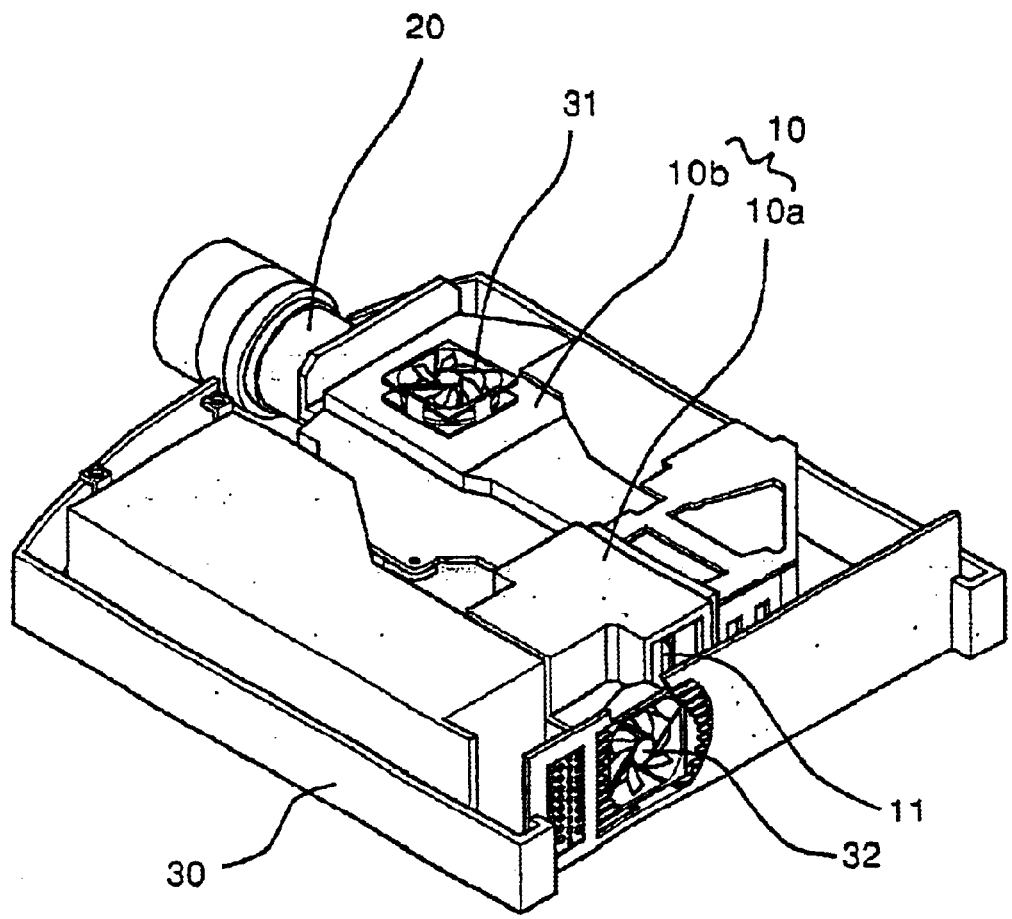
FIG. 1 is a schematic view illustrating the configuration of a general projector.
Figure 2:
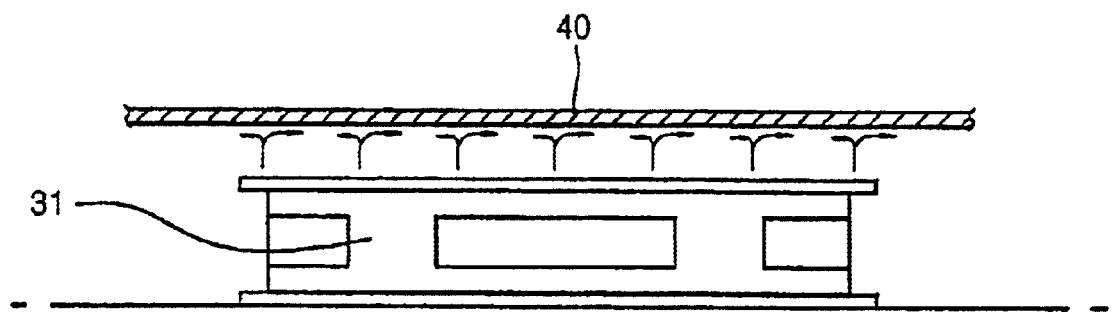
FIG. 2 is a side view illustrating a suction fan installed in the general projector.
Figure 3:
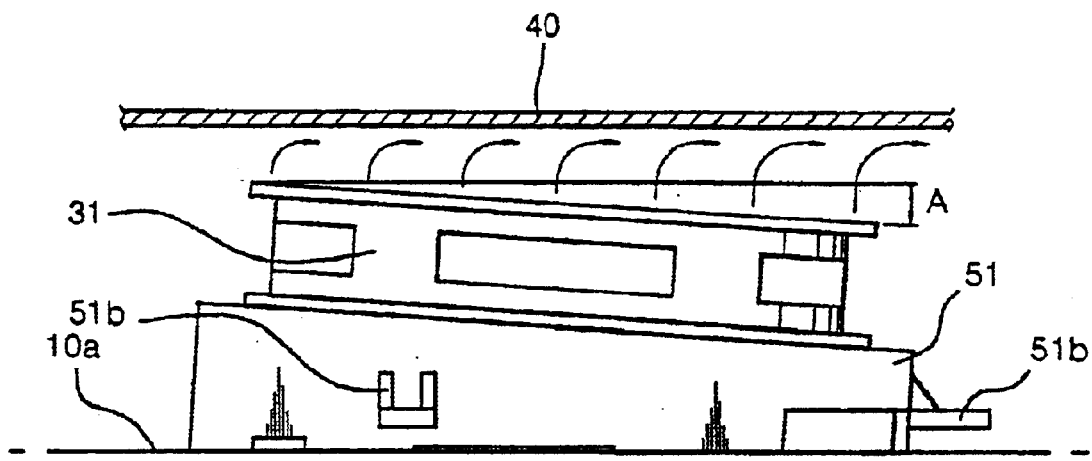
FIG. 3 is a side view illustrating the installed state of a suction fan included in a projector cooling system according to an embodiment of the present invention.

FIG. 3 is a side view illustrating a suction fan installed in a projector cooling system according to the present invention. Referring to FIG. 3, the projector cooling system of the present invention includes an upper case 40 for covering the top of a projector to protect the internal parts of the projector, a suction fan 31 placed below the upper case 40 while being spaced apart from the upper case 40 and adapted to intake the hot air in the synthesizing system 10b, thereby discharging the hot air, and a fan guide 51 placed in an incline position facing the exhaust fan (not shown) and adapted to guide the hot air discharged from the suction fan 31 toward the exhaust fan, mounting protrusions 51b for mounting the fan guide 51 to the synthesizing system 10b in a state in which the fan guide 51 is in tight contact with the synthesizing system 10b. The synthesizing system 10b is arranged beneath the fan guide 51.

Preferably, the exhaust fan (not shown), which is installed to exhaust the hot air in the interior of the projector to the outside, is placed in the path in which the hot air flows from the suction fan 31 in order to directly exhaust the hot air without effecting other internal parts of the projector.

The external exhaust of air heated in the synthesizing system 10b by the cooling system is carried out in such a fashion that air heated due to heat created at the synthesizing system 10b is drawn into the suction fan 31, and then led to the exhaust fan (not shown) via the upper case 40.

During the procedure in which air introduced through the suction fan 31 is led to the exhaust fan, the fan guide 51 serves as an air flow guide means. Since the fan guide 51 is placed in an incline position by a desired angle A with respect to the synthesizing system 10b, the hot air can flow more easily toward the exhaust fan (not shown). Accordingly, even when the cooling system in accordance with the present invention is used for a projector requiring a luminance of 2000 ANSI lumens or higher, exhausting heat would not be any problem. The flow of such hot air is indicated with arrows in FIG. 3.

In order to prevent hot air drawn in by the suction fan 31 from flowing into other parts of the projector, packings may be inserted between facing surfaces of the synthesizing system lob and the fan guide 51 and between facing surfaces of the fan guide 51 and suction fan 31, respectively. By inserting the packings, the path in which the hot air flows is completely sealed. The packings may be made from a various materials such as rubber and asbestos.

Figure 4:
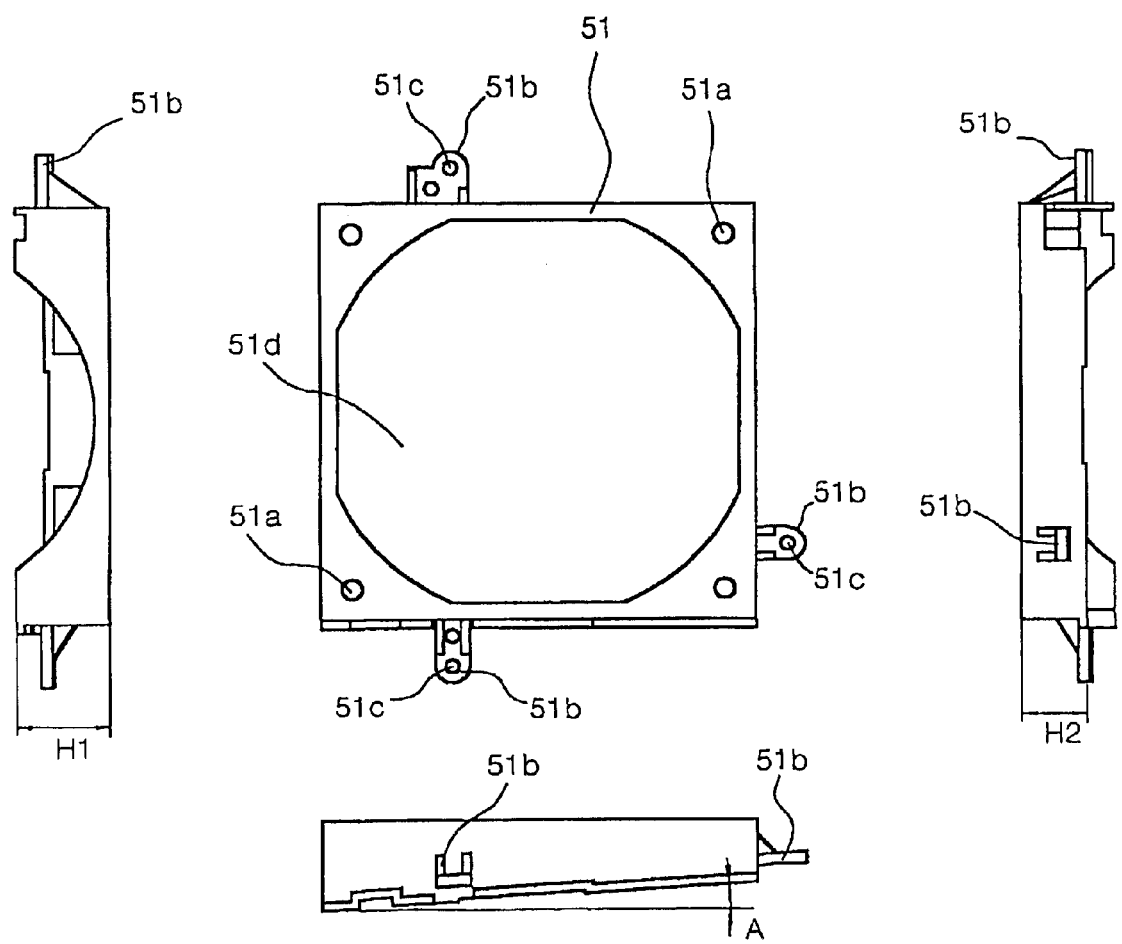
FIG. 4 illustrates a side view, a front view, a rear view, and a plan view of a fan guide according to the embodiment of the present invention.

FIG. 4 illustrates a side view, a front view, a rear view, and a plan view of the fan guide.

Referring to FIG. 4, the top side of the fan guide 51 is provided with fan mounting holes 51a for mounting the suction fan 31. The fan guide 51 also has mounting protrusions 51b at both side surfaces and the rear surface thereof, respectively, so that it can be connected to the synthesizing system 10b. Each mounting protrusion 51b has a guide mounting hole 51c for coupling the fan guide 51 to the synthesizing system 10b. An opening 51d is placed at the center of the fan guide 51 to allow the hot air to flow through the fan guide 51.

As apparent from the side view of FIG. 4, the fan guide 51 is characterized as having placed in the incline position with a desired angle A. By the virtue of such structure, the flow of hot air can be easily guided toward the exhaust fan (not shown).

The height H1 of the front portion of the fan guide 51 is formed at a higher position than the height H2 of the rear portion of the fan guide 51, so that the direction of air flowing through the suction fan 31 can be determined.

Preferably, the B LCD panel, which generates the most heat when compared to other LCD panels, is arranged beneath the short side of the fan guide 51 where the rate of the air flow is at the maximum, thereby the cooling efficiency is enhanced.

Figure 5:
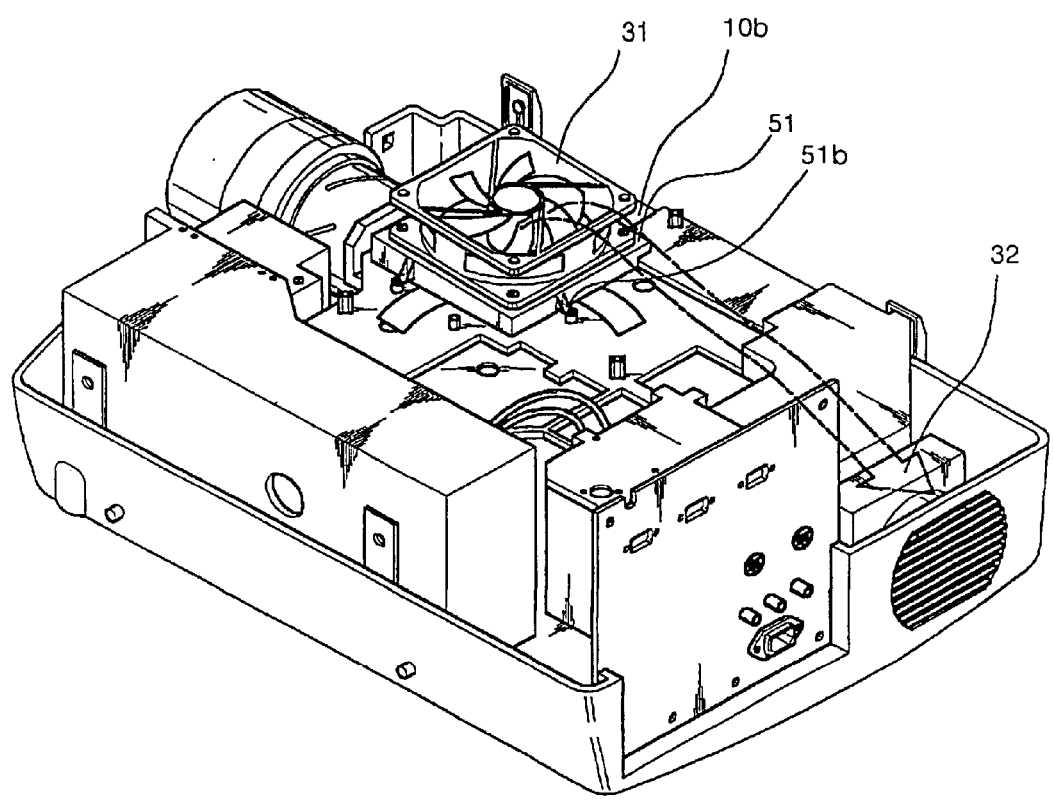
FIG. 5 is a perspective view illustrating the internal configuration of the projector to which the cooling system of the present invention is applied.

FIG. 5 is a perspective view illustrating the internal configuration of the projector to which the cooling system of the present invention is applied.

Referring FIG. 5, the cooling system of the present invention includes the fan guide 51 arranged in an incline position on the top of the synthesizing system 10b and utilized as an air flow guide means for adjusting the direction that air flows, the suction fan 31 sealably fastened to the upper surface of the fan guide 51, and the exhaust fan 32 for exhausting air discharged from the suction fan 31 to the outside via the upper case (not shown).

As mentioned above, the present invention provides a cooling system capable of more efficiently cooling the synthesizing system 10b while rapidly exhausting the hot air without effecting other parts of the projector. The hot air generated in the synthesizing system 10b and discharged by the suction fan 31 hit the upper case in angle with respect to the upper case. Accordingly, the interference of the upper case with the flow of hot air is reduced. Therefore, hot air discharged from the suction fan 31 is rapidly drawn to the exhaust fan 32 via the upper case, and then immediately exhausted by the exhaust fan 32. In order to achieve smoother exhaust of the hot air, it is preferable to direct the angle forming the incline position of the fan guide 51 (the angle A in FIG. 3) toward the exhaust fan 32.

Meanwhile, the height and angle of the inclination in each of the suction fan 31 and fan guide 51 may be determined in accordance with the specification of a projector, to which the cooling system of the present invention is applied, because they depend upon the entire height of the projector and the height of the upper case (denoted by the reference numeral 40 in FIG. 3).

Preferably, the exhaust fan 32 is arranged at the rear wall of the projector to minimize the effect on the appearance of the projector while achieving an efficient cooling of the illumination system 10a.

Figure 6:
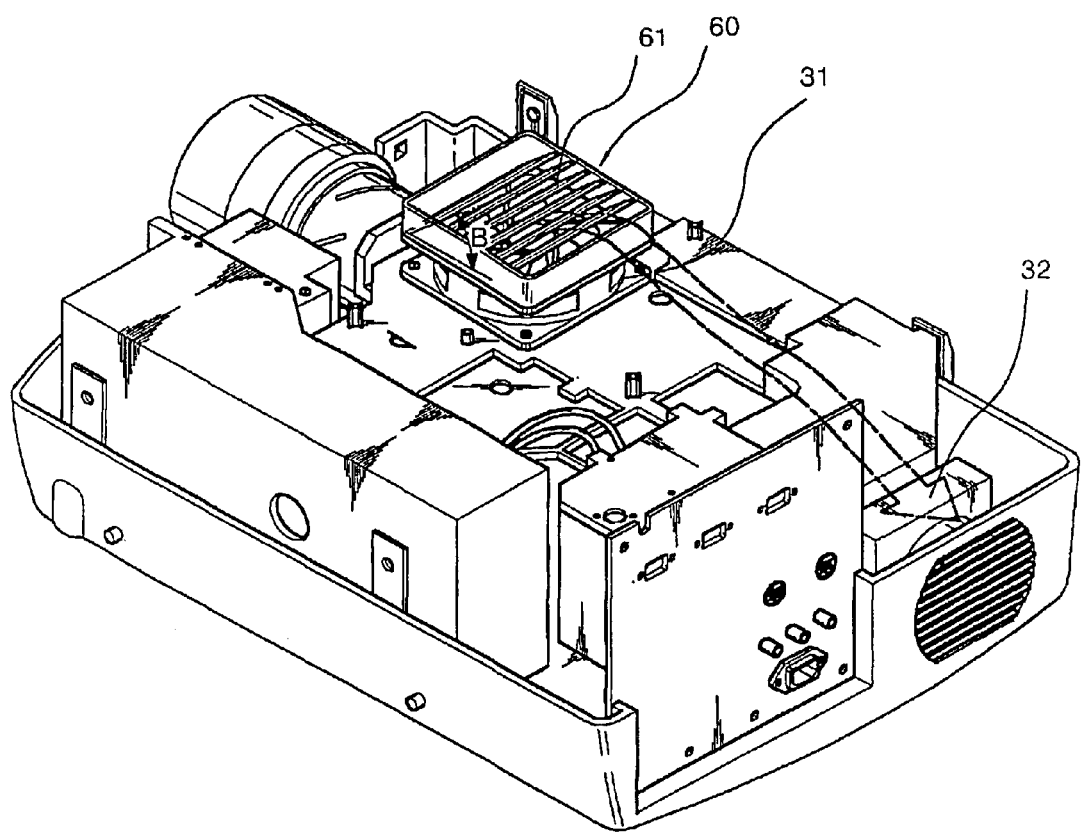
FIG. 6 is a perspective view illustrating another embodiment of the present invention.

FIG. 6 illustrates another embodiment of the present invention.

Referring to FIG. 6, an exhaust guide 60 is provided to guide the flow of air discharged from the top of the suction fan 31 toward the exhaust fan 32. A plurality of guide panels 61 are provided at the exhaust guide 60. The guide panels 61 are placed in incline positions toward the exhaust fan 32 in order to guide the flow of air discharged from the suction fan 31 toward the exhaust fan 32.

That is, each guide panel 61 incline toward the exhaust fan 32 at a desired angle B. The angle B of each guide panel 61 should be less than 90° and varies according to the specification of the projector.

Similar to the fan guide 51, the exhaust guide 60 serves to allow the hot air discharged from the suction fan 31 to flow smoothly toward the exhaust fan 32 as it passes along the guide panels 61. Thus, the hot air generated in the synthesizing system 10b can be rapidly exhausted by the exhaust fan 32. In this embodiment, therefore, it is possible to efficiently cool the synthesizing system 10b, as in the above mentioned embodiment.

The above mentioned fan guide 51 and guide panel 61 serve as the air flow guide means for guiding the flow of air discharged from the suction fan 31 in the direction of the exhaust fan 32 in order to achieve an efficient cooling of the synthesizing system 10b. Although such an air flow guide means is illustrated in the form of the fan guide 51 or guide panel 61, other configurations may be implemented as the air flow guide means.

The aforementioned two embodiments in accordance with the present invention may be employed together to obtain an enhanced effect.

INDUSTRIAL APPLICABILITY

As apparent from the above description, the projector cooling system of the present invention solves problems of the conventional cooling system for the cooling of the synthesizing system included in the projector by rapidly exhausting hot air generated in the synthesizing system through the exhaust fan by utilizing the air flow guide means. Although the cooling system of the present invention has been described as being applied to the synthesizing system of the projector, it may be easily and effectively applied to other heat sources.

What is claimed is:

1. A cooling system for a projector, comprising:
   a suction fan placed at a top of a synthesizing system of the projector;
   an exhaust fan adapted to exhaust hot air in the projector to outside; and
   a fan guide fastened at a surface between the top of the synthesizing system and a bottom of the suction fan, wherein one end of the fan guide has a shorter height than the other end so that the suction fan is placed in an inclined position to allow the hot air to be quickly exhausted.

2. The cooling system according to claim 1, wherein the end of the fan guide having a shorter height is arranged toward the exhaust fan.

3. The cooling system according to claim 1, further comprising:
   fan mounting holes provided at corners of the fan guide; and
   coupling members respectively inserted in the fan mounting holes to mount the suction fan to the fan guide such that the suction fan and the fan guide are in tight contact with each other.

4. The cooling system according to claim 1, further comprising:
   mounting protrusions provided on at least one side surface of the fan guide, wherein each of the mounting protrusions has a guide mounting hole to tightly fasten the guide fan and the synthesizing system; and
   coupling means inserted in the guide mounting holes of the mounting protrusions.

5. The cooling system according to claim 1, further comprising:
   packings placed between facing surfaces of the synthesizing system and the fan guide and/or between facing surfaces of the fan guide and the suction fan, respectively, the packings serving to prevent air from leaking between the synthesizing system and the fan guide and/or between the fan guide and the suction fan.

6. The cooling system according to claim 1, wherein the end of the fan guide having a shorter height is placed above a blue LCD panel included in the projector.

7. The cooling system according to claim 1, wherein the exhaust fan is arranged at a rear surface of the projector.

8. A cooling system for a projector, comprising:
   a suction fan placed at an upper portion of a synthesizing system of the projector;
   an exhaust fan configured to exhaust hot air in the projector to an area outside of the projector; and
   an air flow guide positioned at an incline relative to the synthesizing system and configured to guide hot air discharged from the synthesizing system by the suction fan to the exhaust fan.

9. The cooling system according to claim 8, wherein the air flow guide comprises a fan guide placed between facing surfaces of the synthesizing system and the suction fan, wherein a height of one end of the fan guide is shorter than a height of the other end so as to place the suction fan in an inclined position.

10. The cooling system according to claim 9, wherein the end of the fan guide having a shorter height is arranged toward the exhaust fan.

11. The cooling system according to claim 9, further comprising a plurality of packings positioned between the fan guide and the suction fan, wherein the plurality of packings are configured to prevent a leak between the fan guide and the suction fan.

12. The cooling system according to claim 9, further comprising a plurality of packings positioned between the synthesizing system and the fan guide, wherein the plurality of packings are configured to prevent a leak between the fan guide and the suction fan.

13. The cooling system according to claim 8, wherein the air flow guide comprises an exhaust guide placed above the suction fan and provided with the guide panels.

14. The cooling system according to claim 13, wherein each of the guide panels is inclined toward the exhaust fan by an angle of 90 degrees or less.

15. A cooling system for a projector, comprising:
   a suction fan configured to be positioned adjacent to a heat source of the projector; and
   an inclined air flow guide configured to allow hot air discharged from the suction fan to pass therethrough so as to guide the hot air toward an exhaust fan of the projector.

16. The cooling system according to claim 15, wherein the air flow guide comprises a fan guide positioned between the heat source and the suction fan, wherein a height of one end of the fan guide is shorter than a height of the other end, so as to place the suction fan in an inclined position.

17. The cooling system according to claim 16, wherein the end of the fan guide with a shorter height is positioned toward the exhaust fan.

18. The cooling system according to claim 15, wherein the air flow guide comprises an exhaust guide positioned above the suction fan, wherein the exhaust guide comprises a plurality of panels.

19. The cooling system according to claim 18, wherein the plurality of panels are configured to extend across the exhaust guide at an incline with respect to the suction fan.

20. The cooling system according to claim 19, wherein each of the plurality of panels is inclined toward the exhaust fan.

21. A cooling system for a projector, comprising:
a suction fan configured to be in air flow communication with a synthesizing system of the projector;
an exhaust fan configured to exhaust hot air in the projector to an area outside of the projector;
an air flow guide configured to be in air flow communication with the synthesizing system and the suction fan, and positioned at an incline relative to the synthesizing system so as to guide hot air discharged from the synthesizing system towards the exhaust fan.

22. The cooling system of claim 21, wherein the air flow guide comprises a fan guide configured to be positioned between the synthesizing system and the suction fan, wherein one end of the fan guide has a shorter height than the other end so as to place the suction fan at an incline.

23. The cooling system of claim 22, wherein the end of the fan guide having a shorter height is arranged toward the exhaust fan.

24. The cooling system of claim 21, wherein the air flow guide comprises an exhaust guide configured to be positioned on an upper surface of the suction fan.

25. The cooling system of claim 24, wherein the exhaust guide comprises a plurality of guide panels configured to extend across the exhaust guide at a predetermined angle so as to guide the hot air discharged from the synthesizing system by the suction fan towards the exhaust fan.

26. The cooling system of claim 25, wherein each of the plurality of guide panels is inclined toward the exhaust fan at an angle of less than 90 degrees.

* * * * *